US006141296A

United States Patent [19]

Progar

[11] Patent Number: 6,141,296

[45] Date of Patent: Oct. 31, 2000

[54] TIME-OF-DAY CLOCK ASSEMBLY

[75] Inventor: Paul Michael Progar, Plymouth, Mich.

[73] Assignee: Ford Motor Company, Dearborn, Mich.

[21] Appl. No.: 09/335,966

[22] Filed: Jun. 18, 1999

[51] Int. Cl.[7] .................................. G04F 5/00; G06F 1/04

[52] U.S. Cl. ............................................ 368/156; 364/200

[58] Field of Search ..................................... 368/155–156, 368/200–202; 331/47, 65, 66, 176; 702/85, 89, 150, 179

[56] References Cited

U.S. PATENT DOCUMENTS 4,708,491 11/1987 Luitje .
4,903,251 2/1990 Chapman .
5,274,545 12/1993 Allan et al. ............................ 564/148
5,771,180 6/1998 Gulbert .................................. 364/557

*Primary Examiner*—Vit Miska
*Attorney, Agent, or Firm*—Mark L. Mollon

[57] ABSTRACT

A time-of-day clock assembly 10 having an oscillator 14 which generates resonant signals used to selectively update a time-of-day register 27. The assembly 10 increments register 27 at intervals of time which are temporarily modified in order to correct for fractional and calibration type errors.

6 Claims, 1 Drawing Sheet

TIME-OF-DAY CLOCK ASSEMBLY

FIELD OF THE INVENTION

This invention relates to a time-of-day clock assembly and more particularly, to a time-of-day clock assembly having improved accuracy due to a correction of oscillator related errors.

BACKGROUND OF THE INVENTION

Clock assemblies are used in many diverse types of assemblies and systems, such as within vehicles, to maintain and to selectively display the "time-of-day" and to perform other time dependent functions and operations.

Typically, many of these clock assemblies include a microcontroller and/or microprocessor which utilize the relatively high resonant frequency signals generated by a crystal oscillator to periodically produce an estimation of the time-of-day. Particularly, the frequency of these oscillator generated signals is typically reduced or "scaled" in order to allow for the estimation of desired and discrete intervals of time, such as a minute or a second, to be achieved. While these clocks do maintain and selectively display the time-of-day, they suffer from some drawbacks which reduce their respective accuracy. Importantly, even relatively small inaccuracies, if not properly corrected or compensated, will accumulate over time causing the creation of relatively large undesirable errors.

For example, the resonant frequency of the oscillators often drifts or varies, thereby causing the calculated time-of-day to be inaccurate and requiring the clock to be periodically and manually adjusted.

Further, due to manufacturing intolerances, the resonant frequency of most commercially available and relatively cost effective crystal oscillators typically varies from about 20 pulses or parts per million ("ppm") to about 500 ppm from their respective specified or "published" frequencies. These tolerance type variances or "calibration type errors," if uncompensated, will also result in significant errors in the time-of-day kept by the clock.

Moreover, these crystal oscillators typically produce a resonant signal having a frequency which is not divisible by an even number, thereby creating certain "fractional errors" when used to produce discrete ("minute" or "second") time estimates. These "fractional errors" accumulate over time and cause significant inaccuracies in the time-of-day kept by the clock.

While certain assemblies and devices have been proposed to compensate for these oscillator related errors, such as the use of variable load capacitors, they undesirably and respectively increase the overall cost and complexity of the clock assembly. Further, none of these prior compensation assemblies typically provide for fractional error correction.

There is therefore a need for a new and improved time-of-day clock assembly which provides a relatively accurate measure or estimate of the time-of-day and which is relatively cost efficient.

SUMMARY OF THE INVENTION

It is a first object of the invention to provide a time-of-day clock assembly which overcomes some or all of the previously delineated drawbacks associated with prior time-of-day clock assemblies.

It is a second object of the invention to provide a time-of-day clock assembly having an improved accuracy and being relatively low in cost.

It is a third object of the invention to provide a time-of-day clock assembly which can be used in combination with a crystal oscillator having a signal frequency that is not evenly divisible by an even number.

It is a fourth object of the invention to provide a time-of day clock assembly which efficiently corrects both fractional and calibration type errors.

According to a first aspect of the present invention a time-of-day clock assembly having a certain accuracy is provided. The assembly includes a first register containing a time-of-day value and a display coupled to the first register and selectively displaying the contained time-of-day value. The assembly further includes an oscillator generating several first signals and a system clock coupled to the oscillator and which receives the several first signals and which generates several second signals.

The assembly further includes a second register, containing a first counter value equaling an initial threshold value and being coupled to the system clock and to the first register. The first counter value is decremented by one each time that one of the second signals is received by the second register. The first counter value is then reset to the initial threshold value when the first counter value has been decremented to zero. The second register further generates and communicates a third signal to the first register each time that the first counter value is reset, effective to periodically increase the contained time-of-day value by a certain desired amount.

The assembly further includes a third register which is coupled to the second register and which contains a second counter value. The second counter value is incremented each time that a third signal is generated by the second register and is reset when the second counter value is equal to a certain error compensation value. The third register further generates and communicates a fourth signal to the second register each time that the second counter value is reset, effective to selectively and temporarily increase the first counter value by a certain amount, thereby increasing the accuracy of the clock assembly.

According to a second aspect of the present invention, the time-of-day clock assembly further includes a fourth register, coupled to the second register and having a third counter value that is incremented each time a third signal is generated by the second register and being reset when the third counter value equals a certain calibration threshold value. The fourth register further generates and communicates a fifth signal to the second register each time the third counter value is reset, effective to selectively and temporarily increase the first counter value by a certain amount, thereby increasing the accuracy of the clock assembly.

According to a third aspect of the present invention a method is provided for use in combination with a time-of-day clock assembly which generates interrupt signals having a certain frequency which are used to periodically estimate the time-of-day, the estimated time-of-day being selectively provided to a display. The method including the steps of receiving the interrupt signals; creating a first whole number; creating a second fractional number; creating an estimate of the time-of-day when a certain number of the interrupt signals equaling the first whole number are received; modifying the first whole number by use of a second fractional number; creating an estimate of the time-of-day when a second number of the interrupt signals, equaling the modified whole number, are received, thereby providing a substantially accurate time-of-day estimate.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
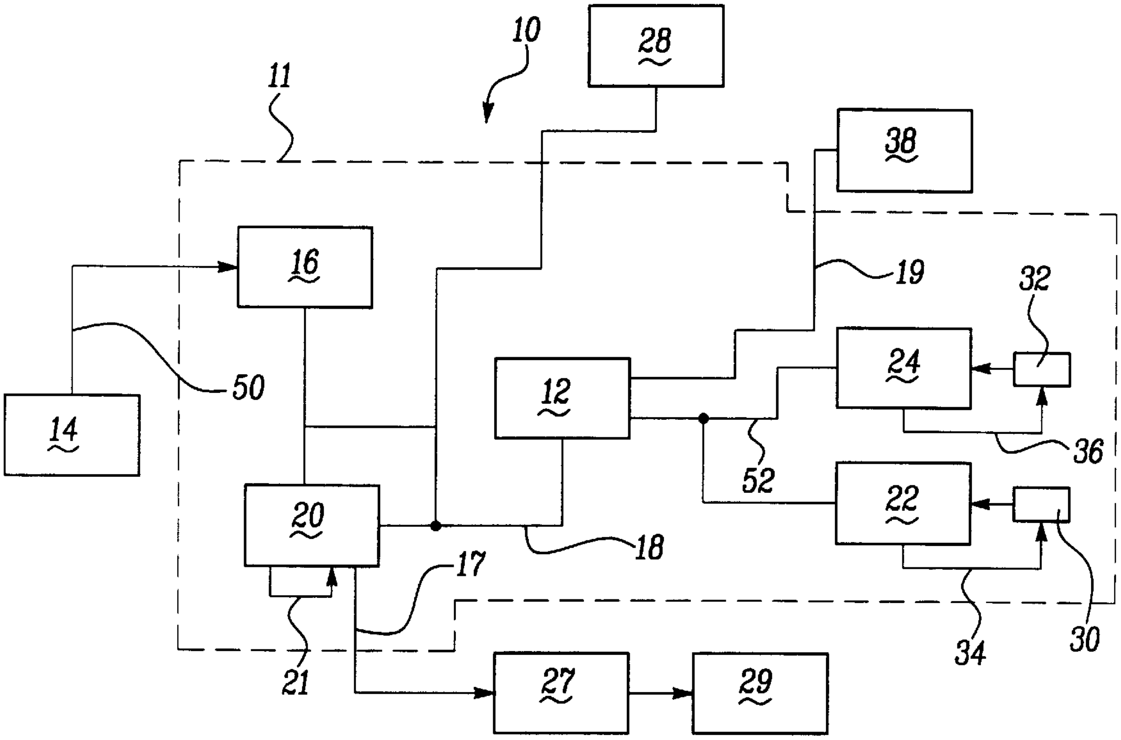
FIG. 1 is a block diagram illustrating a time-of-day clock assembly which is made in accordance with the teachings of the preferred embodiment of the invention.

Referring now to FIG. 1, there is shown a time-of-day clock assembly 10 made in accordance with the teachings of the preferred embodiment of the invention. As shown, assembly 10 includes a conventional and/or commercially available microprocessor assembly 11 operating under stored program control and having a central controller or processor 12 which is electrically, physically and communicatively coupled to a system clock and scaling circuit assembly 16 and a countdown register 20 by use of bus 18. Processor 12 is further coupled to a fractional error accumulator or register 22 and a calibration error accumulator or register 24, by use of a communications bus or path 52. Microprocessor 12 is further physically, electrically, and operatively coupled to a voltage supply or source 38 which selectively provides electrical power to assembly 10 along bus 19, and to frequency counter 28 by use of bus 18.

Assembly 10 further includes a conventional and commercially available crystal oscillator 14 which is physically and communicatively coupled to system clock and scaling circuit assembly 16 by bus 50, and which periodically and selectively generates resonant timing type signals to assembly 16 at a certain frequency. Assembly 16 receivably "divides" the frequency associated with the received signals emanating from oscillator 14 by a certain amount or value (e.g., by 10) and generates output signals or "interrupt signals" at this "scaled down" or "divided" frequency, sometimes referred to as the "real time interrupt rate". Typically, the resonant frequency is an even multiple of the real time interrupt rate or frequency.

Countdown register 20, operating under the control of processor 12, operatively and selectively contains a certain value which is selectively decremented by one each time that a signal is generated by assembly 16 and received by register 20. Moreover, register 20 includes a reset line 21 which is controlled by microprocessor 12 and which selectively causes the register 20 to again contain the certain value after the register value has been selectively decremented to zero. Register 20 also includes an output line 17 which is physically, electrically and communicatively coupled to a value register 27 which contains a current and estimated time-of-day value. Output signals on line 17, from register 20, are effective to selectively increment the value contained within register 27. Register 27 is also coupled to a display 29 which selectively displays the current time-of-day value held within register 27.

Register 22 and calibration error accumulator register 24 each comprise conventional and commercially available accumulation type registers which are respectively adapted to selectively and mathematically add the values that they receive, thereby respectively producing a "running total" of the respectively received values. Registers 22 and 24 also contain respective "reset" lines or busses 34 and 36 which are operatively controlled by microprocessor 12 and which selectively reset the respective registers 22 and 24 to a known value. That is, in one embodiment, reset lines or busses 34 and 36 are respectively connected to value storage registers 30, 32. Each register 30 and 32 respectively and selectively contains a certain value and provides the respective value to respective registers 22 and 24 upon receipt of a signal appearing upon respective lines 34, 36. These values, when respectively received by the respective register 22 and 24, are added to the values contained within the respective registers 22 and 24.

Frequency counter 28 is a conventional and commercially available frequency calibration assembly which measures the frequency of electronically generated signals and which is selectively, physically and communicatively coupled to microprocessor 12 and system clock 16.

In operation, system clock 16 selectively and countably receives timing type signals from crystal oscillator 14 having a certain resonant frequency. Once a first predetermined number of these timing signals have been received, clock assembly 16 generates a signal or "interrupt" and again begins to countably receive the oscillator generated signals. Thus, each time that a predetermined number or "group" of these oscillator generated timing signals has been countably received, an interrupt signal is generated. In this manner, interrupt timing signals are generated at a "scaled down" frequency from the frequency of the signals emanating from oscillator 14. In one embodiment, the resonant frequency is an even multiple of the "scaled down" or interrupt frequency.

By way of example and without limitation, the interrupt signal period (e.g. the amount of time separating adjacent interrupt signals and referred to as the "real time interrupt rate" or "RTI"), is, in one embodiment, equal to about 32,768 microseconds. Hence, one interrupt signal is generated about every 32,768 microseconds. Accordingly, about 1,831.0546875 interrupt signals or periods are generated every minute (i.e., 60/0.032768=number of interrupt signals generated per minute).

This value or rate is calculated by and used within system 10 (e.g., by microprocessor 12) in order to calculate or "keep" time. That is, processor 12 recognizes that each minute of time corresponds to the generation of about 1,831 interrupt signals and this calculated time or "minute" estimate has a "fractional error deficiency" which is substantially equal to the time associated with the generation of about 0.0546875 interrupt periods (i.e., using only the whole number of 1,831 interrupt periods to calculate the passage of a minute will cause the clock to be "fast"). In the preferred embodiment of the invention, this fractional error deficiency is selectively corrected, thereby increasing the overall accuracy of the clock assembly 10.

The interrupt signals, generated by clock 16, are received by countdown register 20, which is initialized to hold a threshold value corresponding to and/or substantially equaling the whole or non-fractional number of interrupt signals occurring within a predetermined time interval, such as a minute (e.g., 1,831). If assembly 10 is to update the value held in register 27 during some other predetermined time interval, the whole number of interrupt signals generated during this respective and alternative time interval are placed within register 20.

As each interrupt signal is received by register 20, the value held in register 20 is decreased or decremented by one. Once the value held in the register 20 reaches zero, controller 12 causes reset line 21 to re-initialize register 20 to its original value (e.g., 1,831 or to another value equaling the whole number of interrupt signals occurring within an alternate desired incremental interval of time), and further causes register 20 to output an "increment signal" to register 27, effective to increment the value of register 27 by one, thereby incrementing the display 29 by one minute (or by some other desired increment of time).

The displayed time-of-day is inaccurate or "fast" since a fractional error deficiency exists and is equal to the time associated with the fractional portion of the number of interrupt signals or periods occurring within this interval of time. In this non-limiting embodiment, an error value of about 1792 microseconds (i.e., 0.0546875 interrupt periods×32,768 microseconds per interrupt period) occurs and will accumulate each time that an increment signal of one minute of time is output to register 27 at the end of each "countdown sequence" of register 20. While the foregoing operative embodiment utilizes a time interval of a minute, it should be understood that any other time intervals, such as a interval of a second or fractions of a second, may also be selectively employed by the preferred embodiment of the invention in a substantially identical manner and with substantially identical results. This fractional error must be and is corrected in order to improve the overall accuracy of the time-of-day clock assembly 10.

Each time, in this embodiment, that register 20 outputs a "minute" increment signal to register 27, microprocessor 12 generates a fractional error signal representing the time value of the fractional error associated with one minute (i.e., 1,792 microseconds) and selectively outputs this time value to accumulator 22. Accumulator 22 maintains a "running total" of these received fractional error values by sequentially and receivably adding the error value of each of the received fractional error signals to its presently contained value, thereby additively updating the contained present value. Initially, the accumulator 22 may have a value of zero.

Once the contained value exceeds a certain threshold value, accumulator 22 generates a signal to microprocessor 12. In this non-limiting embodiment, this predetermined threshold value substantially equals the time associated with one interrupt signal period (i.e., 32,768 microseconds). The selectively generated accumulator output signal causes microprocessor 12 to operatively force the reset line 34 to input the value contained in storage register 30, which in this non-limiting embodiment is the negative value of one such interrupt signal period (e.g., −32,768 microseconds), into accumulator 22, thereby causing the contained value within the accumulator 22 to be reset to a value equal to its preceeding value less an amount of 32,768 (e.g., zero).

Microprocessor 12, upon receiving the output signal from accumulator 22, also selectively and temporarily increments the threshold value of register 20 by one, thereby requiring register 20 to count a whole number of 1832 interrupt signals before generating the next signal to register 27, thereby causing the clock assembly 10 to temporarily "run slower", thereby selectively correcting the accumulated fractional error deficiency which is substantially equal to the threshold value of register 22. The next signal is then generated by use of 1831 interrupt signals. In another embodiment, microprocessor 12 performs this "incrementation" by re-initializing register 20 to a value of 1,832. Alternatively, microprocessor 12 may increment the value of register 20 by one. In the foregoing manner, system 10 selectively compensates for fractional error deficiencies and provides for an accurate time-of-day clock.

It should also be understood that these fractional error deficiencies may be selectively corrected after longer periods of time have elapsed in order to substantially reduce the amount of required processing and to improve overall operational efficiency. For example and without limitation, the present invention may be selectively adapted to accumulate and periodically correct fractional errors occurring or associated with multiple interrupt signals (e.g., two interrupt signals) In such an embodiment, accumulator 22 is initialized to selectively generate an output signal to microprocessor 12 and to reset line 34 only when the value contained within the accumulator 22 equals or exceeds twice the interrupt signal time period.

Frequency counter 28 is selectively, physically, communicatively, and electrically coupled to system clock assembly 16 and measures the frequency of the crystal oscillator 14 and the frequency of the interrupt signals which are output by system clock 16. Frequency counter assembly 28 compares the actual or measured frequency of the interrupt signals to the "ideal" frequency of the interrupt signals which would occur if the oscillator 14 were performing exactly according to specification (e.g., without "tolerance" type errors).

Counter assembly 28 further and selectively determines an "amount of error" by subtracting the actual signal frequency of the generated interrupt signals from the "specified" or "ideal" signal frequency. This error value is selectively provided to microprocessor 12. In this non-limiting numerical example and/or embodiment, the "ppm error" equals +54.8 microseconds per second or 3288 microseconds per minute (54.8 microseconds per second×60 seconds per minute).

Calibration error accumulator 24 selectively corrects this calibration error after the cumulative and/or additive error reaches a certain predetermined amount or level. That is, in operation, each time that register 20 outputs a "minute increment" signal to clock 26, microprocessor 12 generates a calibration error signal representing the "time value" of the calibration error associated with one minute of time (e.g., 3,288 microseconds), and selectively outputs this value to accumulator 24.

Accumulator 24, which may have an initial value of zero, receives these calibration error signals and maintains and selectively updates a value representing the "running total" of the amount of calibration error represented by the received signals (e.g., the calibration error of each of the received signals is cumulatively added within accumulator 24). Accumulator 24 generates a signal, to processor 12 when the contained error value exceeds a predetermined value. In this embodiment, the predetermined value is equal to one interrupt signal time period (e.g., 32,768 microseconds). After receiving the output signal, microprocessor 12 activates the reset line or bus 36, thereby causing the value contained in storage register 32, which in this non-limiting embodiment substantially equals the negative value of one interrupt signal period (e.g., −32,768 microseconds), to be additively communicated to the accumulator 24, thereby causing the contained value within the accumulator 24 to be reset to a certain value equal to its preceding value less 32,768 (e.g. zero).

Microprocessor 12, upon receiving the output signal from accumulator 24, also selectively and temporarily increments the threshold value held by register 20, by one, in the previously delineated manner, thereby requiring register 20 to count a total of 1832 interrupt signals before generating the next incrementation signal to register 27.

If the measured or actual interrupt signal period is slower than the "ideal" or the "published" period, the microprocessor 12, upon receiving the output signal from accumulator 24, selectively and temporarily decrements the threshold value held by register 20, by one, in the previously delineated manner, thereby requiring register 20 to count a total of 1830 interrupt signals before generating the next incrementation signal to register 27.

In yet another embodiment of the invention, accumulator 24 adds each of the received calibration error signals until the contained and additive error value equals or exceeds exactly one minute of error (i.e., 60,000,000 microseconds). In this embodiment, once the value of 60,000,000 microseconds is accumulated in register 24, microprocessor 12 generates an increment or decrement signal directly to register 27, thereby incrementing or decrementing the value held by register 27 by one minute and correcting the accumulated calibration error. In yet another embodiment, the fractional error correction and calibration error correction may be simultaneously and respectively applied.

It should be understood that the inventions described herein are provided by way of example only and that numerous changes, alterations, modifications, and substitutions may be made without departing from the spirit and scope of the inventions as delineated within the following claims.

What is claimed is:

1. A time-of-day clock assembly having a certain accuracy and comprising:

a display which selectively displays a time-of day value;

an oscillator which generates a plurality of signals having a certain frequency; and a controller which is communicatively coupled to said oscillator and to said display, said controller receiving said plurality of signals and using said plurality of signals to produce a number of second signals having a certain second frequency, said controller further having a certain stored value which selectively and initially equals a first of two values, each of said two values corresponding to different respective intervals of time, said controller further updating said displayed time-of-day value at substantially identical intervals of time specified by said certain stored value, said controller further including a counter which counts a first number of said second signals and which causes said certain stored value to equal a second of said two values after said first number of said second signals has been counted, thereby increasing the accuracy of said displayed time-of-day clock assembly.

2. A time-of-day clock assembly comprising:

a first register containing a time of day value;

a display coupled to said first register and selectively displaying said contained time-of-day value;

an oscillator generating a plurality of first signals; and a controller assembly coupled to said first register and to said oscillator, said controller assembly generating a plurality of second signals having a respective second frequency wherein said first frequency is an even multiple of said second frequency, said controller assembly further counting each of said plurality of generated second signals and periodically producing a first value representative of the number of said second signals which have been counted, said controller assembly further having a threshold value and generating and communicating a third signal to said first register effective to update said contained time-of-day value when said first value is equal to said threshold value, said controller assembly further containing a second threshold value and counting the number of said third signals which have been generated and communicated to said first register and temporarily incrementing said first threshold value when said number of said counted third signals equals said second threshold value, thereby ensuring that said time-of-day value is substantially accurate.

3. A time-of-day clock assembly comprising:

a first register containing a time-of-day value;

a display coupled to said register and selectively displaying said contained time-of-day value;

an oscillator generating a plurality of first signals;

a controller;

a system clock assembly coupled to said oscillator, receiving said plurality of said first signals, and generating a plurality of second signals;

a second register containing a first counter value which is fixed at an initial threshold value and being coupled to said system clock, to said controller, and to said first register, said first counter value being decremented by one each time that one of said plurality of said second signals is received by said second register and being reset to said initial threshold value after said first counter value is decremented to zero, said second register generating and communicating a third signal to said first register each time that said first counter value is reset, effective to periodically increase the contained time-of-day value by a certain desired amount; and a third register coupled to said second register and said controller, said third register having a second counter value which is incremented each time that a third signal is generated by said second register and being reset after said second counter value is equal to a certain compensation value, said third register generating and communicating a fourth signal to said second register each time that said second counter value is reset, effective to selectively and temporarily increase said first counter value by a certain amount, thereby increasing the accuracy of said time-of-day clock assembly.

4. The time-of-day clock assembly of claim 3 further comprising:

a fourth register, coupled to said controller and to said second register and having a third counter value that is incremented each time a third signal is generated by said second register and is reset when said third counter value is equals a certain calibration threshold value, said fourth register generating and communicating a fourth signal to said second register each time said third counter value is reset effective to selectively and temporarily modify said first counter value by a certain amount, thereby further increasing the accuracy of said time-of-day clock assembly.

5. A time-of-day clock assembly employing a crystal oscillator that emits timing signals at a certain frequency, said assembly comprising:

a first register which contains a time-of-day value;

a system clock coupled to said oscillator for receiving said timing signals and for generating interrupt signals in response to said receipt of said timing signals, said interrupt signals being separated by a fixed interrupt period which differs from an ideal interrupt period by a certain calibration error value;

a second register coupled to said system clock and to said first register for receiving and counting said interrupt signals and, based upon said counted interrupt signals, for periodically generating increment signals at certain intervals of time to said time-of-day clock, each of said increment signals being effective to increment the time value held by said first register;

a frequency counter, coupled to said system clock and to said oscillator, for measuring said frequency of said emitted timing signals and for measuring said calibration error value; and a controller, coupled to said first register, said system clock and said frequency counter, for using said measured calibration error value to calculate a calibration correction value and for using said calibration correction value to temporarily modify at least one of said certain intervals of time, thereby increasing the accuracy of the clock assembly.

6. A method for use in combination with a time-of-day clock assembly which generates interrupt signals having a certain frequency which are used to periodically estimate the time-of-day, said assembly providing the estimated time-of-day to a display, said method comprising:

receiving said interrupt signals;

creating a first whole number;

creating a second fractional number;

creating an estimate of said time-of-day when a certain number of said interrupt signals equaling said first whole number are received;

modifying said first whole number by use of second fractional number; and creating an estimate of said time-of-day when a second number of said interrupt signals equaling said modified whole number are received, thereby providing a substantially accurate time-of-day estimate.

* * * * *